(12) United States Patent
Lai et al.

(10) Patent No.: US 7,652,971 B2
(45) Date of Patent: Jan. 26, 2010

(54) THRESHOLD CURRENT MODIFYING DEVICE AND METHOD

(76) Inventors: Ronnie Lai, 8F, No. 535, Chung-Cheng Rd., Hsin-Tien, Taipei 231 (TW); Ronald Chen, 8F, No. 535, Chung-Cheng Rd., Hsin-Tien, Taipei 231 (TW)

( * ) Notice: Subject to any disclaimer, the term of this patent is extended or adjusted under 35 U.S.C. 154(b) by 795 days.

(21) Appl. No.: 11/339,680

(22) Filed: Jan. 26, 2006

(65) Prior Publication Data
US 2006/0181990 A1    Aug. 17, 2006

Related U.S. Application Data

(60) Provisional application No. 60/646,634, filed on Jan. 26, 2005.

(51) Int. Cl.
*G11B 7/00* (2006.01)

(52) U.S. Cl. .................... 369/116; 369/47.5

(58) Field of Classification Search ............. 369/47.52, 369/47.51, 47.5, 121, 120, 116
See application file for complete search history.

(56) References Cited

U.S. PATENT DOCUMENTS

| | | | |
|---|---|---|---|
| 5,625,616 A * | 4/1997 | Koike et al. | 369/53.26 |
| 6,671,248 B2 | 12/2003 | Miyabata et al. | |
| 6,922,383 B2 | 7/2005 | Sakata et al. | |
| 6,950,378 B1 * | 9/2005 | Miyazaki et al. | 369/47.52 |
| 7,505,384 B2 * | 3/2009 | Nakao et al. | 369/47.5 |
| 7,518,969 B2 * | 4/2009 | Masui et al. | 369/59.12 |
| 2004/0136420 A1 | 7/2004 | Robinson et al. | |
| 2006/0181327 A1 | 8/2006 | Lai et al. | |

FOREIGN PATENT DOCUMENTS

| | | |
|---|---|---|
| CN | 1821923 | 8/2006 |
| CN | 1821924 | 8/2006 |
| TW | 200627122 | 8/2006 |
| TW | 200629031 | 8/2006 |

OTHER PUBLICATIONS

Notice of Allowance for U.S. Appl. No. 11/339,749, Mail Date Dec. 5, 2008, 9 pages.

* cited by examiner

*Primary Examiner*—Nabilz Hindi
(74) *Attorney, Agent, or Firm*—Perkins Coie LLP (57) ABSTRACT

A threshold current modifying device is provided for an optical pickup head. The optical pickup head initially generates an output power when an operating current is larger than a threshold current of the optical pickup head, and the threshold current is related to a temperature of the optical pickup head in a functional relationship. The threshold current modifying device includes a threshold current calculating module and a power control module. The threshold current calculating module receives a temperature signal from the optical pickup head at a first temperature to output a threshold current signal according to the temperature signal and the functional relationship. The power control module receives the threshold current signal to adjust the operating current.

16 Claims, 7 Drawing Sheets

THRESHOLD CURRENT MODIFYING DEVICE AND METHOD

BACKGROUND OF THE INVENTION

1. Field of Invention

The invention relates to a threshold current modifying device and a threshold current modifying method, and, in particular, to a threshold current modifying device and a threshold current modifying method, which are applicable to an optical disk drive.

2. Related Art

An electric device is sensitive to temperature such that the performance and accuracy of the electric device may be affected by temperatures surrounding the electric device. In order to control the electric device at different temperatures, a proper control module must be designed to modify the effects resulting from thermal factors.

In order to control the output power of the electric device at different temperatures, a proper control module is designed in the electric device. Herein, a power feedback signal, which is generated when the electric device generates the output power, is applied to control the operating current for driving the electric device to generate the output power at different powers.

Figure 1A:
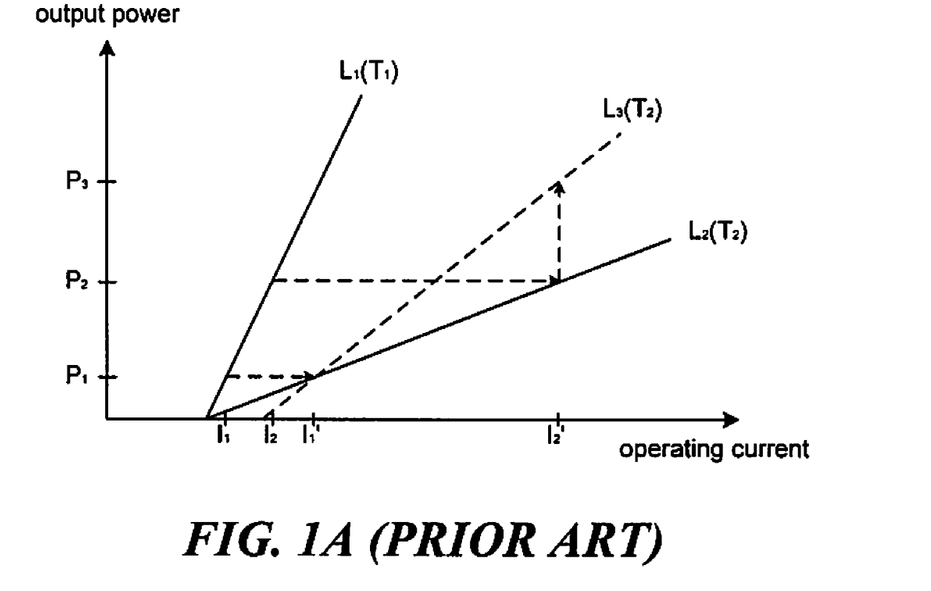
FIG. 1A is a curve relation diagram showing the output power and the operating current of the conventional electric device.

Referring to FIG. 1A, when the temperature of the electric device is at a temperature $T_1$, a relationship between the output power and the operating current of the electric device is represented as a line $L_1$. In other words, when the operating temperature of the electric device is at the temperature $T_1$ and the operating current is at a current $I_1$, the electric device generates the output power at a power $P_1$. If the operating current is at a current $I_2$, the electric device generates the output power at a power $P_2$. If the temperature of the electric device rises to a temperature $T_2$, the control module increases the operating current according to the power feedback signal until the electric device generates the output power at the power $P_1$. At the same time, the operating current is equal to current $I_1'$. In addition, with the prior technique a line $L_2$ represents a relationship between the output power and the operating current of the electric device at the temperature $T_2$. In order to control the electric device to generate the output power at a power $P_2$, the control module calculates the required current $I_2'$ to drive the electric device to generate the output power at the power $P_2$ according to the operating current variance ($I_1'-I_1$) which results from the temperature variance for the power $P_1$, and a scale relationship between the power $P_1'$ and the power $P_2$ in lines $L_1$ and $L_2$. The calculation is shown as the following formula (1).

$$I_2 = \frac{P_2}{P_1}(I_1' - I_1) + I_2 \qquad (1)$$

In fact, when the temperature of the electric device is at a temperature $T_2$, the output power and the operating current of the electric device are actually related by a line $L_3$ rather than the line $L_2$. Therefore, the calculated operating current, which is equal to a current $I_2$, drives the electric device to generate the output power at the power $P_3$. Thus, the electric device does not correctly generate the output power at the power $P_2$ and the output power is not precisely controlled at the temperature $T_2$.

Because the prior technique disregards the threshold currents (intersections of the line $L_1$, line $L_3$ and the current axis), an error between the power $P_2$ and power $P_3$ occurs. If the threshold current is ineffectual, the error caused by the prior technique is not obvious. In other words, when the temperature of the electric device is at the temperature $T_2$, the actual line $L_3$ is close to the line $L_2$ referred by the prior technique. However, if the threshold current is effectual or the output power is to be controlled more precisely, the operating current calculated according to the prior technique may include error.

Figure 1B:
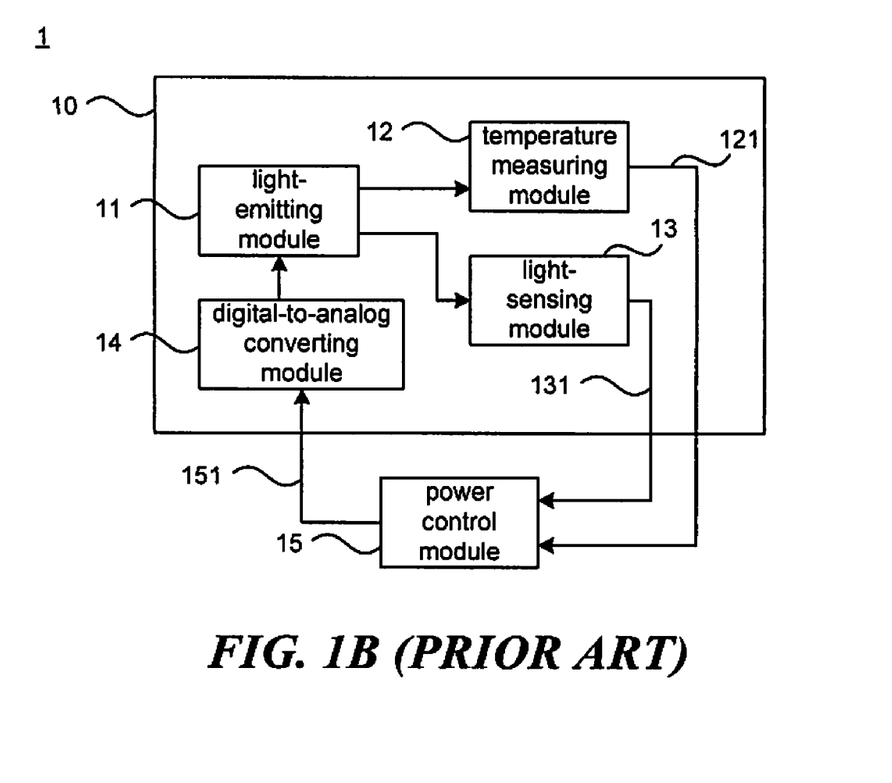
FIG. 1B is a block diagram showing the power control structure of the optical pickup head in the optical disk drive.
Figure 1C:
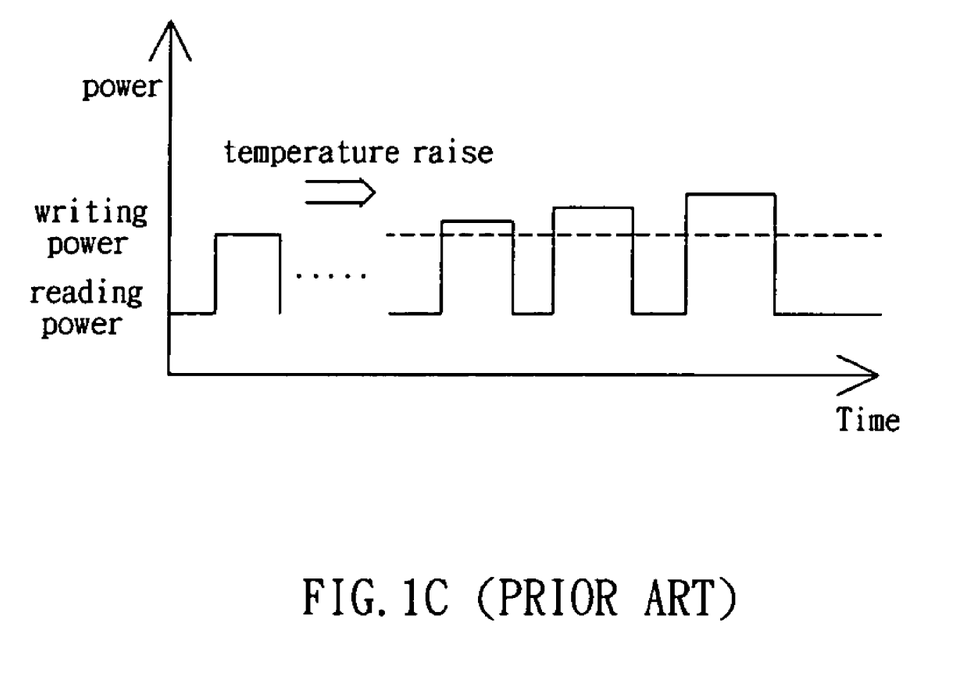
FIG. 1C is a schematic view showing the writing power and the reading power of the conventional optical pickup head.

Taking an optical disk drive for example, an optical pickup head of the optical disk drive is easily affected by thermal factors and behaves such as the electric device described above. Referring to FIG. 1B and FIG. 1C, in the power control structure of the optical pickup head in the optical disk drive, an optical disk drive 1 includes an optical pickup head 10 and a power control module 15. The optical pickup head 10 includes a light-emitting module 11, a temperature measuring module 12, a light-sensing module 13, and a digital-to-analog converting module 14. The temperature measuring module 12 measures the temperature of the light-emitting module 11 to output a temperature signal 121. The light-sensing module 13 senses the output power of the light-emitting module 11 to generate a power feedback signal 131. The power control module 15 receives the temperature signal 121 and the power feedback signal 131 to generate a current control signal 151 in the above method. The digital-to-analog converting module 14 receives the current control signal 151 to generate an operating current 141. The operating current 141 drives the light-emitting module 11 to generate output powers $P_1$ and $P_2$. The output powers $P_1$ and $P_2$ are respectively a writing power $P_w$ and a reading power $P_r$ for accessing an optical disk. However, if the temperature of the light-emitting module 11 rises, only the reading power $P_1$ is precisely controlled but the writing power $P_w$ due to the disregarded threshold currents. Therefore, the optical pickup head 10 does not correctly access the optical disk, and, even more, the lifetime of the optical pickup head 10 and the endurance of the optical disk drive 1 are reduced.

It is therefore a subject of the invention to provide a threshold current modifying device and a threshold current modifying method, which calculate the threshold current of the electric device at different temperatures. Thus, the output power of the electric device can be precisely controlled.

SUMMARY OF THE INVENTION

In view of the foregoing, the invention is to provide a threshold current modifying device and a threshold current modifying method, which can calculate the threshold current of an electric device according to the different temperatures thereof.

To achieve the above, a threshold current modifying device is provided for an optical pickup head. The optical pickup head initially generates an output power when an operating current is larger than a threshold current of the optical pickup head, and the threshold current is related to a temperature of the optical pickup head in a functional relationship. The threshold current modifying device includes a threshold current calculating module and a power control module. The threshold current calculating module receives a temperature signal from the optical pickup head at a first temperature and then outputs a threshold current signal according to the temperature signal and the functional relationship. The power control module receives the threshold current signal to adjust the operating current.

To achieve the above, a threshold current modifying method is provided for an optical pickup head. The optical pickup head initially generates an output power when an operating current is larger than a threshold current of the optical pickup head, and the threshold current is related to a temperature of the optical pickup head in a functional relationship. The threshold current modifying method includes the following steps of: measuring the first temperature of the optical pickup head; outputting a threshold current signal according to the first temperature and the functional relationship; and adjusting the operating current according to the threshold current signal.

As mentioned above, since the threshold current modifying device and method according to the invention control the operating current based on the temperature of the electric device and the functional relationship. Thus, the threshold current for different output powers and temperatures in the electric device is calculated, such that the output power of the electric device is precisely controlled.

BRIEF DESCRIPTION OF THE DRAWINGS

The invention will become more fully understood from the detailed description given herein below as illustration only, and thus not in limitation of the present invention, and wherein.

DETAILED DESCRIPTION OF THE INVENTION

The present invention will be apparent from the following detailed description, which proceeds with reference to the accompanying drawings, wherein the same references relate to the same elements.

Figure 2:
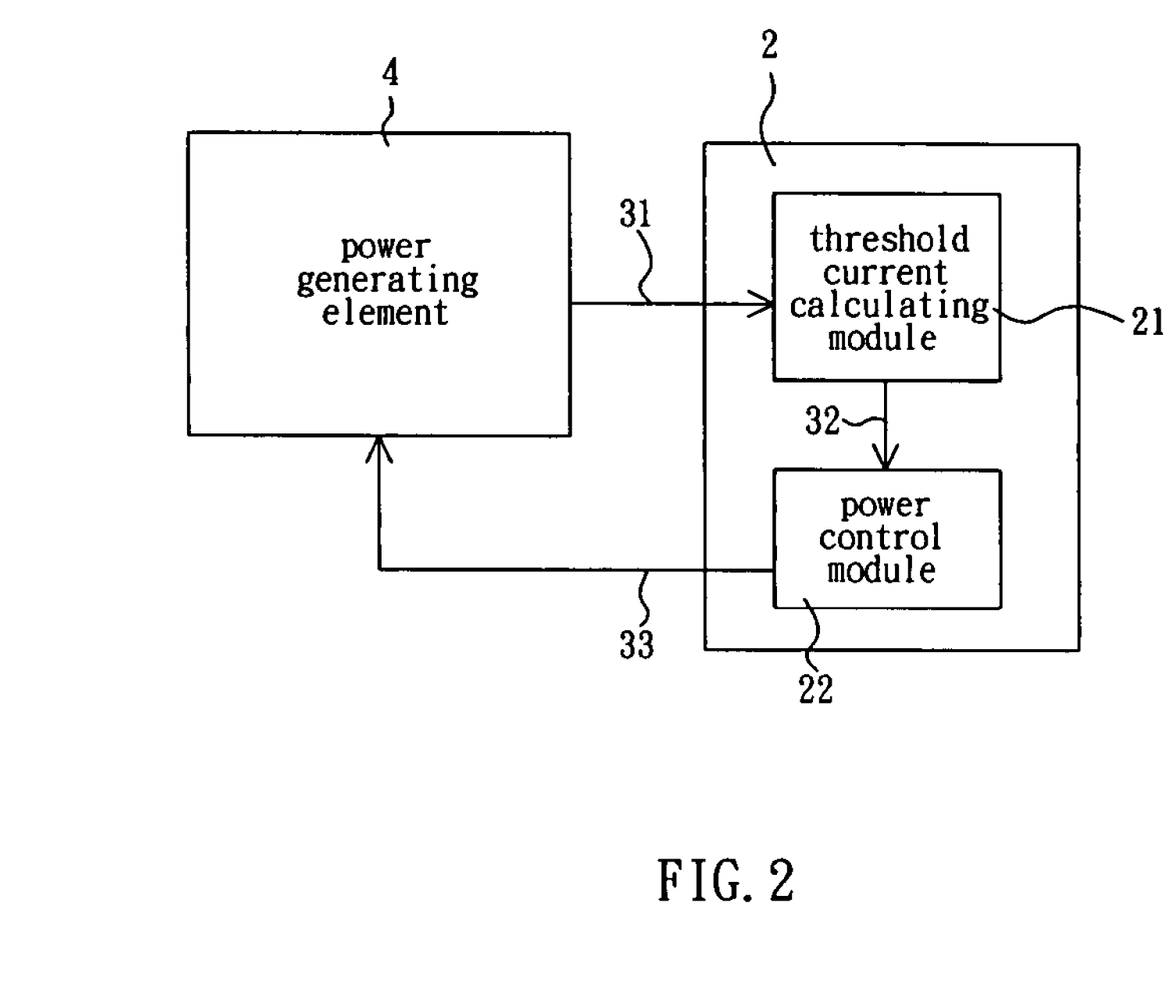
FIG. 2 is a block diagram showing a threshold current modifying device according to a preferred embodiment of the invention.

Referring to FIG. 2, a threshold current modifying device 2 according to a preferred embodiment of the invention is provided for an optical pickup head 4. The optical pickup head 4 initially generates an output power when an operating current is larger than a threshold current of the optical pickup head 4. The threshold current is related to a temperature of the optical pickup head 4 in a functional relationship.

In this embodiment, the threshold current modifying device 2 includes a threshold current calculating module 21 and a power control module 22. The threshold current calculating module 21 receives a temperature signal 31 of the optical pickup head 4 at a first temperature, then the threshold current calculating module 21 outputs a threshold current signal 32 in accordance with the temperature signal 31 and the functional relationship. The power control module 22 receives the threshold current signal 32 to generate a current control signal 33 for adjusting the operating current of the optical pickup head 4.

Figure 3:
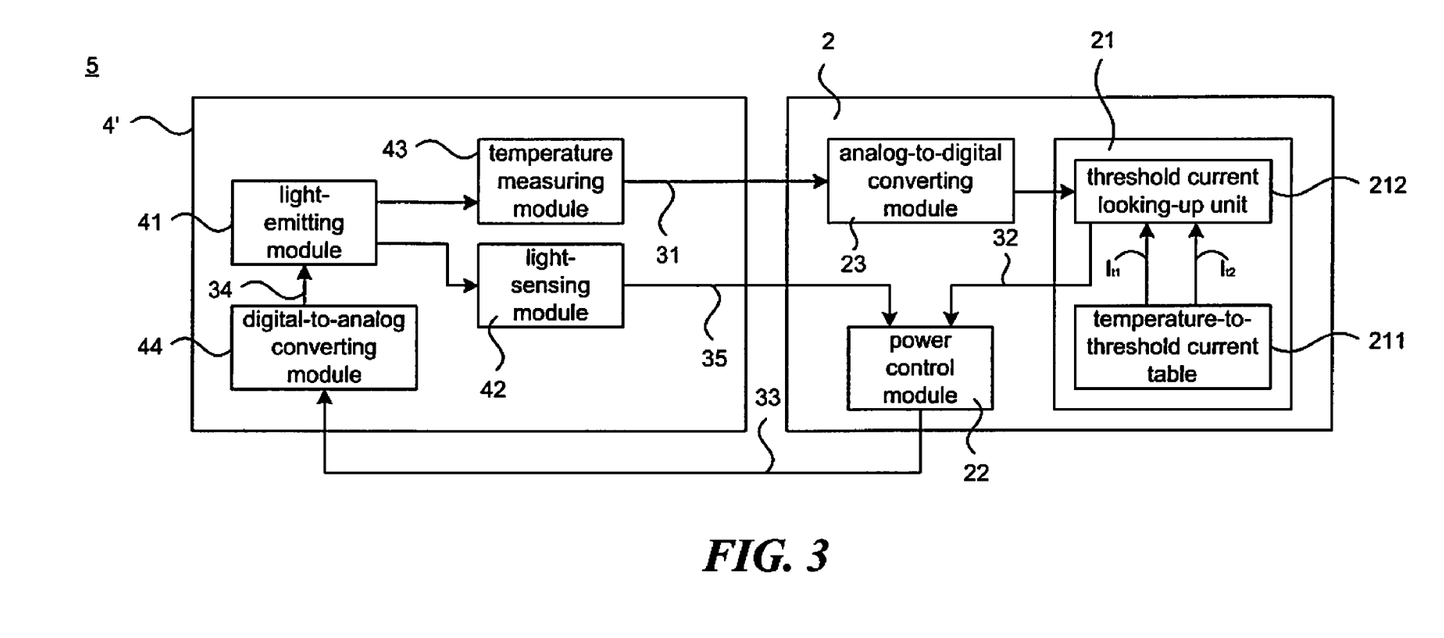
FIG. 3 is another block diagram showing the threshold current modifying device according to the preferred embodiment of the invention.

Referring to FIG. 3, in this embodiment, the optical pickup head 4 and the threshold current modifying device 2 are applied to an optical disk drive 5. The optical pickup head 4 includes a light-emitting module 41, a light-sensing module 42, a temperature measuring module 43, and a digital-to-analog converting module 44.

In the optical pickup head 4, an operating current 34 drives the light-emitting module 41 to generate an output power. The light-sensing module 42 measures the output power of the light-emitting module 41 to generate a power feedback signal 35 applied to the power control module 22 to monitor the output power of the light-emitting module 41. The temperature measuring module 43 measures the temperature of the light-emitting module 41 to output a temperature signal 31, and the digital-to-analog converting module 44 receives the current control signal 33 from the power control module 22 to generate the operating current 34.

Please refer to FIG. 3 again, in the threshold current modifying device 2, the threshold current calculating module 21 includes a temperature-to-threshold current table 211 and a threshold current looking-up unit 212. In addition, the threshold current modifying device 2 includes an analog-to-digital converting module 23. In details, the temperature-to-threshold current table 211 is a corresponding table for the functional relationship between the temperature and the threshold current of the optical pickup head 4. The temperature-to-threshold current table 211 records the threshold currents corresponding to various temperatures of the light-emitting module 41. The threshold current looking-up unit 212 receives the temperature signal 31 and looks a threshold current up in the temperature-to-threshold current table 211 to output the threshold current signal 32 according to the first temperature. In addition, the analog-to-digital converting module 23 converts the temperature signal 31 from analog to digital, then the temperature signal 31 is processed by the threshold current looking-up unit 212.

Figure 4A:
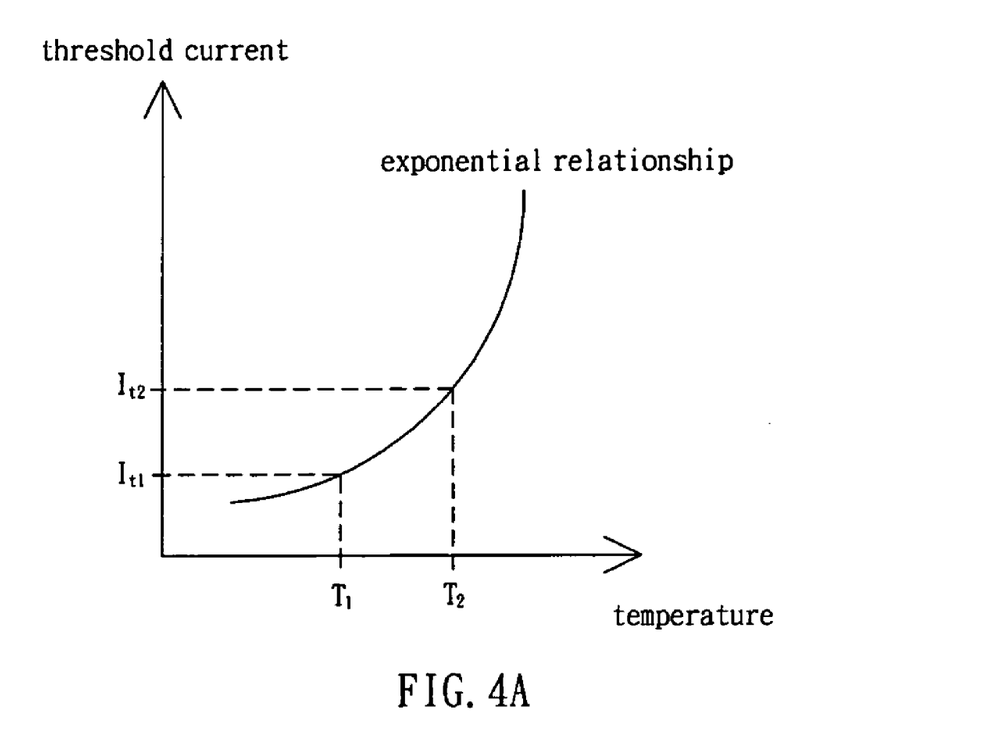
FIG. 4A is a curve relation diagram showing the temperature and the threshold current of the optical read/write module in the threshold current modifying device according to the preferred embodiment of the invention.
Figure 4B:
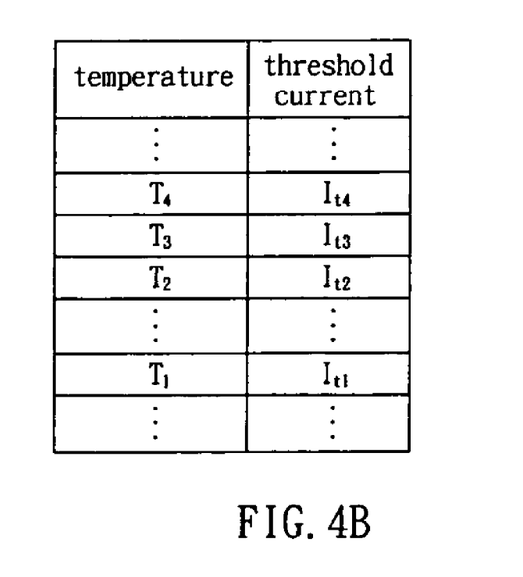
FIG. 4B is a relation table showing the temperature and the threshold current of the optical read/write module in the threshold current modifying device according to the preferred embodiment of the invention.

In this embodiment, because the functional relationship between the temperature of the light-emitting module 41 and the threshold current is an exponential relationship (as shown in FIG. 4A), this exponential relationship could be quantified and stored in the temperature-to-threshold current table 211 of the threshold current modifying device 2 (as shown in FIG. 4B).

Figure 5:
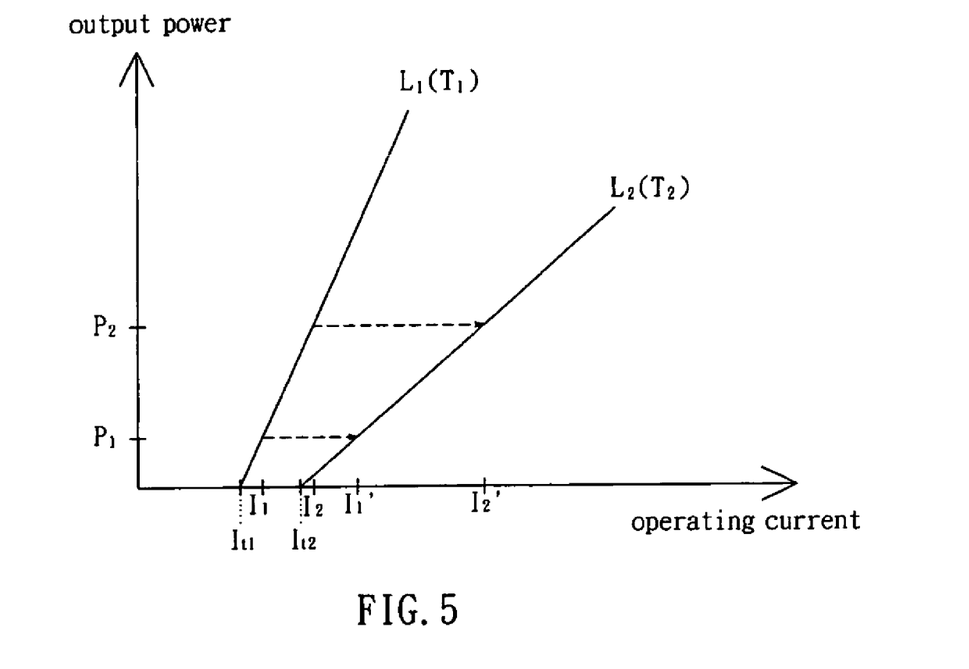
FIG. 5 is a curve relation diagram showing the output power and the operating current of the optical read/write module in the threshold current modifying device according to the preferred embodiment of the invention.

In addition, referring to FIG. 3 and FIG. 5. When the temperature of the light-emitting module 41 is at first temperature $T_1$, the light-emitting module 41 and the operating current 34 is related in a line $L_1$. At this time, the power control module 22 controls the digital-to-analog converting module 44 according to the power feedback signal 35. Therefore, the operating current 34 generated by the digital-to-analog converting module 44 is equal to current $I_1$, and drives the light-emitting module 41 to generate the output power $P_1$.

Besides, if the power control module 22 controls the light-emitting module 41 to generate the output power $P_2$, the threshold current looking-up unit 212 receives the temperature signal 31 and looks a first threshold current $I_{t1}$ of the first temperature $T_1$ up in the temperature-to-threshold current table 211 to output the threshold current signal 32 according to the first temperature. Then, the power control module 22 receives the threshold current signal 32 and calculates the current $I_2$ for generating the output power $P_2$ in accordance with the formula (2). After that, the power control module 22 outputs the calculation as a current control signal 33.

$$I_2 = I_{t1} + \frac{P_2}{P_1}(I_1 - I_{t1}) \quad (2)$$

The digital-to-analog converting module 44 receives the current control 33 to adjust the operating current 34 to be $I_2$ such that the operating current 34 drives the light-emitting module 41 to generate the output power $P_2$ correctly.

Please refer to FIG. 3 and FIG. 5 again. When the temperature of the light-emitting module 41 is at temperature $T_2$, the output power of the light-emitting module 41 and the operating current 34 are related in a line $L_2$ in FIG. 5. After the temperature of the light-emitting module 41 rises to temperature $T_2$, the light-sensing module 42 measures the output power of the light-emitting module 41 to generate the power feedback signal 35. The power control module 22 and the digital-to-analog converting module 44 raise the operating current 34 to $I_1'$ according to the power feedback signal 35, such that the operating current 34 drives the light-emitting module 41 to generate the output power $P_1$ correctly.

At this time, when the light-emitting module 41 is going to generate the output power $P_2$, the temperature measuring module 43 measures the second temperature $T_2$ of the light-emitting module 41 to output the temperature signal 31. The threshold current looking-up unit 212 receives the temperature signal 31 and looks a second threshold currents $I_{t2}$ of the second temperature $T_2$ up in the temperature-to-threshold current table according to the second temperature $T_2$. Then, the threshold current looking-up unit 212 computes the difference between the first threshold current $I_{t1}$ and the second threshold current $I_{t2}$ to output the threshold current signal 32 ($I_{t1}-I_{t2}$).

Following, the power control module 22 receives the threshold current signal 32($I_{t2}-I_{t1}$), and calculates the needed current $I_2'$ for driving the light-emitting module 41 to generate output power $P_2$ at the temperature $T_2$ according to the threshold current signal 32, the proportional relationship between the output power $P_1$ and the output power $P_2$, and the current difference ($I_1'-I_1$) resulting from the temperature difference while generating the output power $P_1$. The calculation is shown in the formula (3) and is output as the current control signal 33.

$$I_2' = (I_{t2} - I_{t1}) + \frac{P_2}{P_1}(I_1' - I_1) + I_2 \quad (3)$$

The digital-to-analog converting module 44 receives the current control signal 33 to adjust the operating current 34, such that the operating current 34 drives the light-emitting module 41 to generate the output power $P_2$ correctly.

Figure 6:
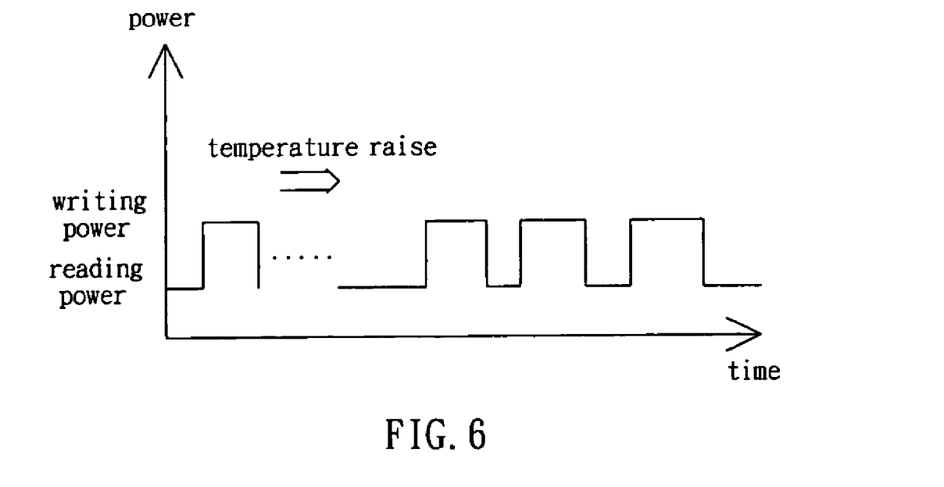
FIG. 6 is a schematic view showing the reading power and the writing power of the optical pickup head in the threshold current modifying device according to the preferred embodiment of the invention.

Referring to FIG. 6, the output power $P_1$ and the output power $P_2$ could be a reading power and a writing power of the optical pickup head 4 respectively. By the process mentioned above, the reading power $P_1$ and the writing power $P_2$ of the optical pickup head are not affected by temperature and are controlled precisely. Hence, the optical pickup head 4 accesses the optical disk accurately, and then the optical disk drive 5 operates regularly.

Please refer to FIG. 3 again. The threshold current modifying device 2 could be implemented with an integrated circuit. The integrated circuit includes the circuit implementing the threshold current calculating module 21 and the power control module 22. The integrated circuit could be a chip, a digital signal processor, a microcontroller, or the like.

Figure 7:
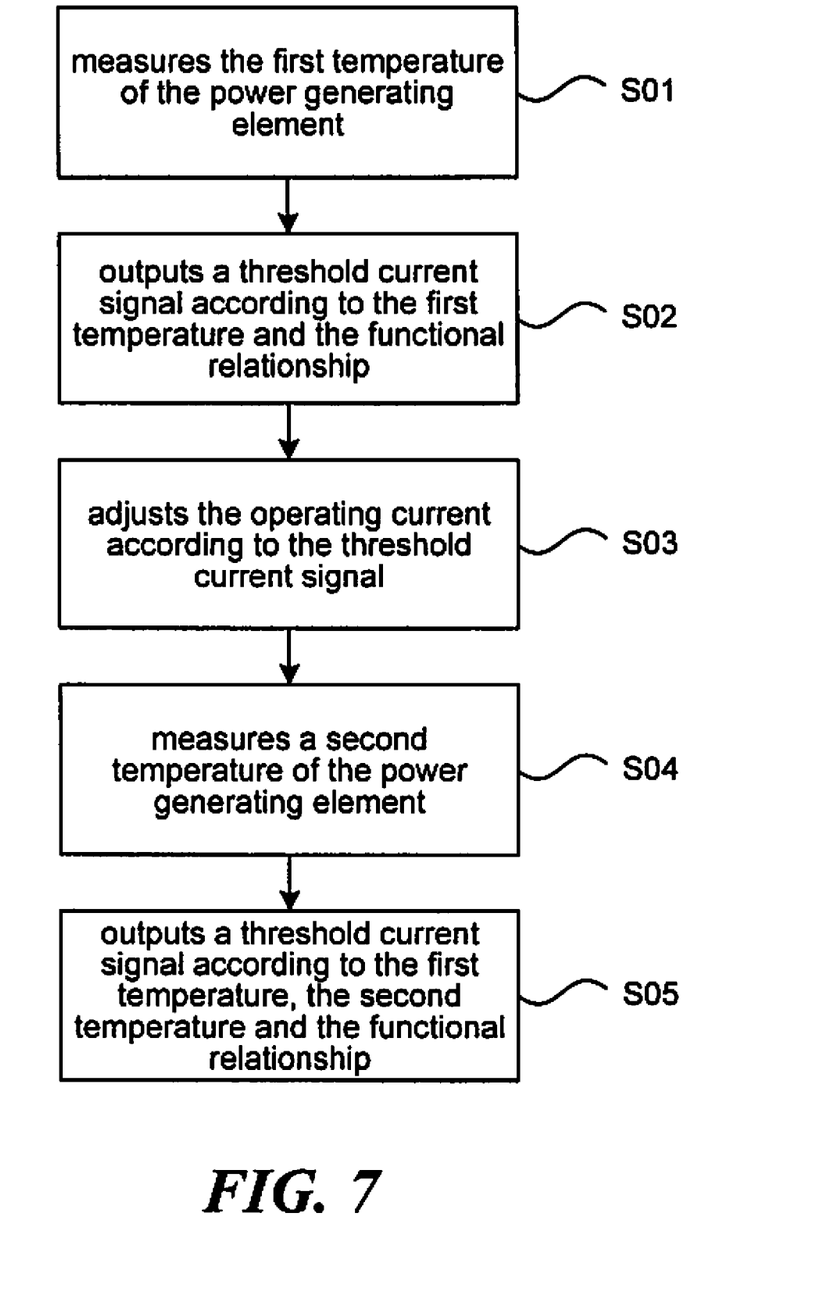
FIG. 7 is a flow chart showing a threshold current modifying method according to a preferred embodiment of the invention.

Referring to FIG. 7, a threshold current modifying method is provided for a optical pickup head. The optical pickup head initially generates an output power when an operating current larger than a threshold current of the optical pickup head is provided, and the threshold current is related to a temperature of the optical pickup head in a functional relationship. The threshold current modifying method includes the steps S01-S03.

The step S01 measures the first temperature of the optical pickup head.

The step S02 outputs a threshold current signal according to the first temperature and the functional relationship. In this embodiment, the step S02 looks a first threshold current of the first temperature up in a temperature-to-threshold current table in accordance with the first temperature to output the threshold current signal. The temperature-to-threshold current table is a corresponding table of the functional relationship between the temperature and the threshold current of the optical pickup head, and records a correspondence between the first threshold current and the first temperature.

The step S03 adjusts the operating current according to the threshold current signal.

In one embodiment, the threshold current modifying method may further include steps S04 to S05.

The step S04 measures a second temperature of the optical pickup head.

The step S05 outputs a threshold current signal according to the first temperature, the second temperature and the functional relationship. In this embodiment, the step S02 looks a second threshold current of the second temperature up in a temperature-to-threshold current table in accordance with the second temperature, and then computes a difference between the first threshold current and the second threshold current to output the threshold current signal.

The threshold current modifying method according to the embodiment can be applied to the threshold current modifying device mentioned in the above embodiment as shown in FIG. 2 to FIG. 6. Thus, the threshold current modifying method of this embodiment can be realized with reference to the previous embodiment, and the detailed descriptions are omitted here.

In summary, since the threshold current modifying device and method according to the invention control the operating current based on the temperature of the electric device and a functional relationship. Thus, the threshold current for different output powers and temperatures in the electric device is calculated, such that the output power of the electric device is precisely controlled.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A threshold current modifying device, comprising:
an optical device including:
an optical pickup head configured to generate an output power when an operating current larger than a threshold current of the optical pickup head is provided to the optical pickup head, wherein the threshold current is related to a temperature of the optical pickup head by a functional relationship;
a threshold current calculating module configured to receive a temperature signal from the optical pickup head at first and second temperatures of the optical pickup head, to output a threshold current signal according to the first temperature, the second temperature and the functional relationship, wherein the threshold current calculating module comprises:
a temperature-to-threshold current table configured to respectively associate a first threshold current value and a second threshold current value to the first temperature and the second temperature; and
a threshold current looking-up unit configured to receive the temperature signal, to respectively look up the first and the second threshold current values in the temperature-to-threshold current table according to the first temperature and the second temperature, to compute a difference between the first threshold current value and the second threshold current value, and to output the threshold current signal according to the difference; and
a power control module configured to receive the threshold current signal and to adjust the operating current according to the threshold current signal.

2. The threshold current modifying device of claim 1, wherein the functional relationship is an exponential function.

3. The threshold current modifying device of claim 1, wherein the optical pickup head comprises:
a digital-to-analog converting module controlled by the power control module to generate the operating current;
a light-emitting module driven by the operating current to generate the output power; and
a temperature measuring module configured to measure temperatures of the light-emitting module and to generate the temperature signal according to the measured temperatures.

4. The threshold current modifying device of claim 1, wherein the threshold current modifying device is installed in an optical disk drive.

5. The threshold current modifying device of claim 1, wherein the threshold current calculating module and the power control module are implemented with an integrated circuit.

6. A threshold current modifying method for an optical pickup head, wherein the optical pickup head is configured to generate an output power when an operating current of the optical pickup head is larger than a threshold current of the optical pickup head, and the threshold current is related to a temperature of the optical pickup head by a functional relationship, the method comprising:
measuring a first temperature of the optical pickup head;
measuring a second temperature of the optical pickup head;
looking up a first threshold current value in a temperature-to-threshold current table according to the first temperature;
looking up a second threshold current value in the temperature-to-threshold current table according to the second temperature, wherein the temperature-to-threshold current table associates the first and second temperatures of the optical pickup head to the threshold current of the optical pickup head according to the functional relationship;
computing a difference between the first threshold current value and the second threshold current value;
outputting the threshold current signal according to the computed difference adjusting the operating current according to the threshold current signal; and
employing the optical pickup head to perform at least one of an optical disk read operation or an optical disk write operation.

7. The threshold current modifying method of claim 6, wherein the functional relationship is an exponential function.

8. The threshold current modifying method of claim 6, wherein the optical pickup head comprises:
a digital-to-analog converting module controlled by the power control module to generate the operating current;
a light-emitting module driven by the operating current to generate the output power; and
a temperature measuring module configured to measure the first temperature of the light-emitting module and to generate the temperature signal according to the measured first temperature.

9. The threshold current modifying method of claim 6, wherein employing the optical pickup head to perform at least one of an optical disk read operation or an optical disk write operation includes:
employing the optical pickup head to perform an optical disk read operation at a first output power level; and
employing the optical pickup head to perform an optical disk write operation at a second output power level, wherein the first output power level is less than the second output power level.

10. A threshold current modifying device, comprising:
an optical device including:
an optical pickup head configured to generate an output power when an operating current larger than a current threshold of the optical pickup head is provided to the optical pickup head, wherein the current threshold is related to a temperature of the optical pickup head by a functional relationship;
a threshold current calculating module configured to receive a temperature signal from the optical pickup head and to output a threshold current signal according to the temperature signal and the functional relationship; and
a power control module configured to receive the threshold current signal and to adjust the operating current according to the threshold current signal, wherein the power control module is further configured to adjust the operating current according to the equation:

$$I2 = It1 + (P2/P1)(I1 - It1),$$

wherein P1 corresponds to the output power while a first operating current of I1 is provided to the optical pickup head, P2 corresponds to the output power while a second operating current of I2 is provided to the optical pickup head, and It1 corresponds to the current threshold at a first temperature of the optical pickup head.

11. The threshold current modifying device of claim 1, wherein the power control module is further configured to adjust the operating current according to the equation:

$$I2' = (It2 - It1) + (P2/P1)(I1' - It1) + I2,$$

wherein P1 corresponds to the output power while a first operating current of I1' is provided to the optical pickup head while the optical pickup head is at a first temperature, P2 corresponds to the output power while a second operating current of I2' is provided to the optical pickup head while the optical pickup head is at the first temperature or while the second operating current of I2' is provided to the optical pickup head while the optical pickup head is at a second temperature, It1 corresponds to the current threshold of the optical pickup head at the first temperature, and It2 corresponds to the current threshold of the optical pickup head at the second temperature.

12. The threshold current modifying device of claim 1, wherein the power control module is further configured to regulate the output power to a first level during a first operating state and to regulate the output power to a second level during a second operating state, wherein the first level is different than the second level.

13. The threshold current modifying device of claim 12, wherein the first operating state corresponds to an optical disk read operation and the second operating state corresponds to an optical disk write operation.

14. A threshold current modifying device, comprising:
a threshold current calculating module configured to receive a temperature signal representing an operating temperature and to output a threshold current signal according to the temperature signal and a functional relationship; and
a power control module configured to receive the threshold current signal, to adjust an operating current according to the threshold current signal, to regulate an output power to a first level during a first operating state, and to regulate the output power to a second level during a second operating state, wherein the power control module is further configured to adjust the operating current according to the equation:

$$I2' = (It2 - It2) + (P2/P1)(I1' - It1) + I2,$$

wherein P1 corresponds to the output power while the operating current at a first operating current of I1' and the temperature signal represents a first temperature, P2 corresponds to the output power while the operating current is at a second operating current of I2' and the temperature signal represents the first temperature or while the operating current is at the second operating current of I2' and the temperature signal represents a second temperature, It1 corresponds to the threshold current corresponding to the first temperature, and It2 corresponds to the threshold current corresponding to the second temperature.

15. A threshold current modifying device for a optical device having an optical pickup head configured to generate an output power when an operating current larger than a threshold current of the optical pickup head is provided to the optical pickup head, wherein the threshold current is related to a temperature of the optical pickup head by a functional relationship, the device comprising;
means for measuring a first temperature of the optical pickup head;
means for measuring a second temperature of the optical pickup head;
means for looking up a first threshold current value in a temperature-to-threshold current table according to the first temperature;
means for looking up a second threshold current value in the temperature-to-threshold current table according to the second temperature, wherein the temperature-to-threshold current table associates the temperature of the optical pickup head to the threshold current of the optical pickup head according to the functional relationship;
means for computing a difference between the first threshold current value and the second threshold current value;
means for outputting a threshold current signal according to the computed difference;
means for adjusting the operating current according to the threshold current signal; and
means for employing the optical pickup head to perform at least one of an optical disk read operation or an optical disk write operation.

16. The threshold current modifying device of claim 15, wherein the means for employing the optical pickup head to perform at least one of an optical disk read operation or an optical disk write operation includes:
means for employing the optical pickup head to perform an optical disk read operation at a first output power level; and
means for employing the optical pickup head to perform an optical disk write operation at a second output power level, wherein the first output power level is less than the second output power level.

* * * * *

UNITED STATES PATENT AND TRADEMARK OFFICE
CERTIFICATE OF CORRECTION

PATENT NO. : 7,652,971 B2  Page 1 of 1
APPLICATION NO. : 11/339680
DATED : January 26, 2010
INVENTOR(S) : Ronnie Lai et al.

It is certified that error appears in the above-identified patent and that said Letters Patent is hereby corrected as shown below:

On title page, in column 2, under "Primary Examiner", line 1, Delete "Nabilz" and insert -- Nabil Z --, therefor.

In column 1, line 52-53, Delete " $I_2 = \dfrac{P_2}{P_1}(I'_1 - I_1) + I_2$ " and insert -- $I'_2 = \dfrac{P_2}{P_1}(I'_1 - I_1) + I_2$ --, therefor.

Signed and Sealed this

Thirteenth Day of April, 2010

David J. Kappos
*Director of the United States Patent and Trademark Office*

UNITED STATES PATENT AND TRADEMARK OFFICE
CERTIFICATE OF CORRECTION

PATENT NO. : 7,652,971 B2  Page 1 of 1
APPLICATION NO. : 11/339680
DATED : January 26, 2010
INVENTOR(S) : Lai et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1037 days.

Signed and Sealed this

Twenty-third Day of November, 2010

David J. Kappos
*Director of the United States Patent and Trademark Office*